United States Patent
Meier

(10) Patent No.: US 7,359,128 B2
(45) Date of Patent: Apr. 15, 2008

(54) SUPPLEMENTARY LENS FOR VIEWING A VIDEO OR COMPUTER SCREEN

(75) Inventor: Walter Meier, Birmensdorf (CH)

(73) Assignee: Granite Trading Ltd., Vaduz (LI)

(*) Notice: Subject to any disclaimer, the term of this patent is extended or adjusted under 35 U.S.C. 154(b) by 166 days.

(21) Appl. No.: 10/538,949

(22) PCT Filed: Dec. 17, 2003

(86) PCT No.: PCT/CH03/00823

§ 371 (c)(1),
(2), (4) Date: Aug. 18, 2005

(87) PCT Pub. No.: WO2004/056102

PCT Pub. Date: Jul. 1, 2004

(65) Prior Publication Data

US 2006/0109417 A1  May 25, 2006

(30) Foreign Application Priority Data

Dec. 17, 2002  (CH) .................................... 2155/02

(51) Int. Cl.
*G02B 27/02* (2006.01)
(52) U.S. Cl. .................. 359/802; 359/798; 379/433.11
(58) Field of Classification Search ................ 359/802, 359/798, 819, 803, 809; 379/433.11, 433.13
See application file for complete search history.

(56) References Cited

U.S. PATENT DOCUMENTS

| 6,086,228 | A  | * | 7/2000 | McGowan et al. | 362/396 |
| 6,313,946 | B1 |   | 11/2001 | Petitto et al. |  |
| 6,417,894 | B1 | * | 7/2002 | Goff et al. | 348/832 |
| 7,088,508 | B2 | * | 8/2006 | Ebina et al. | 359/455 |

FOREIGN PATENT DOCUMENTS

| DE | 44 47 368 A1 | 6/1996 |
| EP | 0 362 692 A2 | 4/1990 |

OTHER PUBLICATIONS

Patent Abstracts of Japan, Display Device, Publication Date: Sep. 13, 1996.
WO 03/098320, Visual Medium, Publication Date: Nov. 27, 2003.
WO 98/52085, Adjustable Magnifying Apparatus and Method for Viewing Video or Computer Screens, Publication Date: Nov. 19, 1998.

* cited by examiner

*Primary Examiner*—Timothy Thompson
(74) *Attorney, Agent, or Firm*—Rankin, Hill & Clark LLP

(57) ABSTRACT

A device (5) for viewing a display screen (2), including a large-area visual medium (1) that can be placed in front of the display screen (2), characterised in that the visual medium (2) has a focal length f of at least 615 mm. The visual medium (2) is preferably a large-area lens (1) that is optimised for viewing an entire display screen (2) with both eyes (4).

28 Claims, 1 Drawing Sheet

SUPPLEMENTARY LENS FOR VIEWING A VIDEO OR COMPUTER SCREEN

BACKGROUND OF THE INVENTION

1. Field of the Invention

The invention relates to the field of viewing aids for observing display screens. It relates to a device for observing a display screen.

2. Description of the Related Art

Such a device is known for example from the U.S. Pat. No. 6,417,894. A supplementary lens is described in this, which is fastened to a computer screen by way of a holding arm and is envisaged for an eye distance of 5 cm to 20 cm in front of the lens. By way of this one may achieve an apparent picture distance of infinity, by which means the accommodation of the eyes for presbyopic users is to be simplified. Numerous ergonomic problems and problems with regard to operating physiology however remain.

SUMMARY OF THE INVENTION

It is therefore the object of the invention to provide a device for observing a display screen which permits improved working conditions and a non-tiring viewing.

This object is achieved by a device for observing a screen.

The invention offers the following advantages:

By way of the fact that the picture appears to the observer in its entirety and in relatively large manner, its observation leads to continuous slight movements of the head which counteracts a stiffening of the neck and shoulder muscle system.

By way of the fact that an optically effective diameter of the device is relatively large, a binocular observation of the complete screen is possible. The pictures appears brighter to the user on account of the focussing of the light emitted from the screen.

By way of the magnifying effect of the device, the picture distance, i.e. the distance at which the observed object or screen appears to the user becomes larger. By way of this the burden to his eyes is reduced by the accommodation. The picture distance may be selected up to infinity, but it has been shown that a certain residual accommodation is advantageous. At the same time the picture distance should not be closer than a "minimum of the visual range" of an observer. The smallest clear visual range for young persons may be up to 25 cm and increases with an increasing age up to approx. 1 m. Advantageous is a clear visual range of 0.5 m to 2 m, corresponding to normal visual behaviour.

Preferably the optical medium has a focal width f between 650 mm and 2'000 mm. A large-surfaced lens with an enlargement may be designed in a comparatively thin manner on account of the large focal width.

This selection corresponds to an optimum of size and weight of the visual medium, in particular of an individual lens with which small distances between the observer, lens and screen are possible, even with large screens. The screen therefore appears in its complete manner and at a comfortable distance even with restricted spatial conditions, so that only a low accommodation is required.

Preferably on use of a single lens, its parameters, in particular the radii of curvature of the two sides of the lens are selected such that astigmatism and coma are low and compensated for both eyes over the complete picture. Simultaneously, by way of a suitable selection of the focal width in combination with the distance of the object and distance of the eye, the picture warping or distortion is minimised.

This type of parameterisation of the lens differs from the conventional procedure: Conventionally, a lens or a lens system is optimised for an observation point on the optical axis or lens axis. This is correct for one half of a binocular glass or for a magnifying glass used with one eye. Binocular vision through a large lens however sets different demands. Conventional lenses or magnifying glasses with the use with both eyes demand a precise arrangement of the lens, eyes and the object, and even then only have a small usable region in which chromatic distortion and picture distortion are acceptable.

The type of parameterisation according to the invention is effected by way of simulation of the imaging of object points onto perceived picture points. At the same time one assumes a perception by the eyes which lie outside the lens axis, and the imaging is carried out for different colour components of an object point. The object points are blurred, i.e. are imaged onto different picture points, in particular on account of the coma effect and the chromatic aberration of the lens. The picture thus becomes slightly blurred. The parameterisation according to the invention is deduced by a systematic variation of the lens parameters until a uniform distribution of the fuzziness onto the whole picture results.

Preferred parameters of an individual lens which result from this optimisation are: focal width between 1000 mm and 1200 mm, eye distance to the lens between 300 mm and 600 mm, and distance of the object to the lens between 300 mm and 500 mm. For a biconvex lens, a radius of an inner lens surface is preferably between 300 mm to 1'000 mm, in particular between 450 mm and 700 mm, and a radius of an outer lens surface preferably between −600 mm and −10'000 mm, in particular between −1'200 mm and −10'000 mm. For a concave-convex lens, a radius of the inner lens surface is preferably between 300 m to 1'000 mm, in particular between 450 mm and 700 mm, and a radius of the outer concave lens surface is preferably between 1'000 mm and 10'000 mm, in particular between 4'000 mm and 6'000 mm.

With an embodiment optimised in such a manner, the further advantage of the invention results: individual picture points of a tube or LCD screen are not enlarged in an ideal manner, but slightly blur into one another. The impression of pixels disappears. This smoothing of the picture very surprisingly is subjectively perceived to be quite pleasant. An ideal enlargement of the screen would also enlarge the picture points and render these better recognisable. Although this is good news for the theoretician, it is however annoying for the observer since he is not interested in the individual picture points, but in the total picture.

The lens is advantageously manufactured of plastic, in particular of PMMA (poymethylmethacrylate) or of CR39. CR39 is usually used for manufacturing plastic lenses of spectacles.

In a further preferred embodiment of the invention, the visual medium comprises a system of several lenses. These are preferably connected to one another with a positive fit.

Further preferred embodiments are to be deduced from the dependent patent claims.

BRIEF DESCRIPTION OF THE DRAWINGS

Hereinafter the subject-mater of the invention is described in more detail by way of preferred embodiment examples which are represented in the accompanying drawings. There are shown in.

The reference numerals which are used in the drawings and their significance are listed in the list of reference numerals. Basically the same parts are provided with the same reference numerals in the figures.

DETAILED DESCRIPTION OF THE INVENTION

Figure 1:
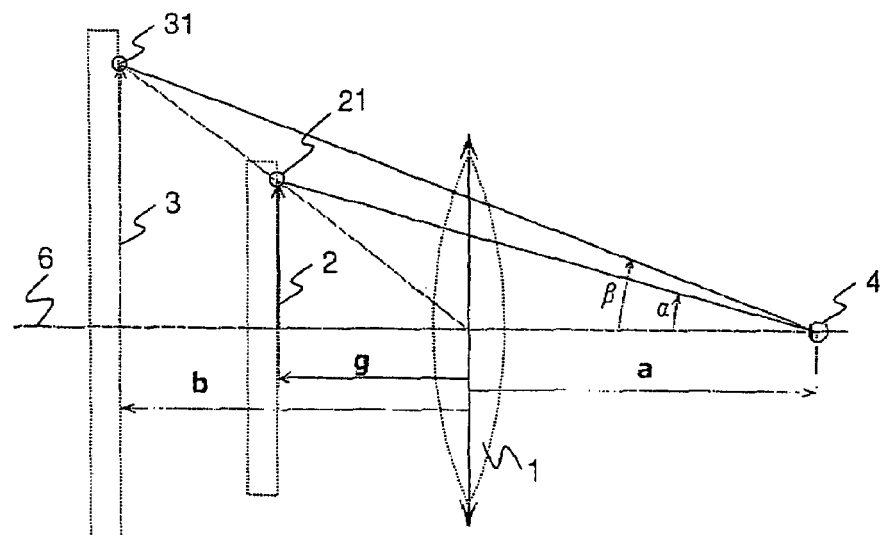
FIG. 1 a schematic representation of a beam path in an optical system.

FIG. 1, for explaining the optical basics, shows a schematic representation of a beam path in an optical system. A lens 1, an object 2 and an eye 4 of an observer are shown in a dashed manner serially along a lens axis 6 or optical axis. An eye distance a is equal to the distance of the eye 4 to the lens 1, or put more accurately, from the lens middle which is usefully defined, and an object distance g is equal to a distance of the object 2 to the lens 1. A part of the object 2 is shown represented as a bold arrow. Without the lens it would appear to the observer at an angle α and at a distance a+g. By way of the effect of the lens l it appears enlarged to the observer as a virtual picture 3 at an angle β and at a distance a+b, wherein b is the picture distance to the lens 1. The imaging is summarised by the equation, $$\frac{1}{f} = \frac{1}{b} - \frac{1}{g}$$

wherein f is the focal width of the lens 1 and the object distance g by convention has a negative sign. A size ratio of the picture 3 to the object 2 is indicated as the theoretical enlargement vt. Thus the following applies $$vt = b/g = f/(f+g)$$

The eye 4 sees the object 2 through the lens l at the larger angle β than without the lens l at the angle α. A visualised enlargement vs is accordingly defined by an angular ratio $$vs = \tan(\alpha)/\tan(\beta) = \frac{b(g+a)}{g(b+a)}.$$

With a positive lens the visualised enlargement vs is smaller than the theoretical enlargement vt.

If one relates the picture distance b and the object distance g to the focal width f, then one obtains related variables $$c = g/f \text{ and } e = a/f$$

with which the visualised enlargement vs may be expressed as $$vs = \frac{c+e}{c+e+eg}.$$

If the dependence of vs is plotted for values of c and e in each case between 0 and 1, then it is evident that the visualised enlargement vs achieves its greatest increase for values of c and e in each case of smaller than 0.5. In particular the enlargement vs increases for values of e between 0 and 0.5, and for values between 0.5 and 1 only in a comparatively weak manner. An increasing eye distance a then only entails a weak increase in the enlargement. Since with a computer screen the eye distance a is advantageously selected larger than the object distance g or the screen distance, preferably values of c between 0.2 and 0.6 and values of e between 0.3 and 0.7 are selected. These permit a focal width f of 0.8 m to 2 m.

Figure 2:
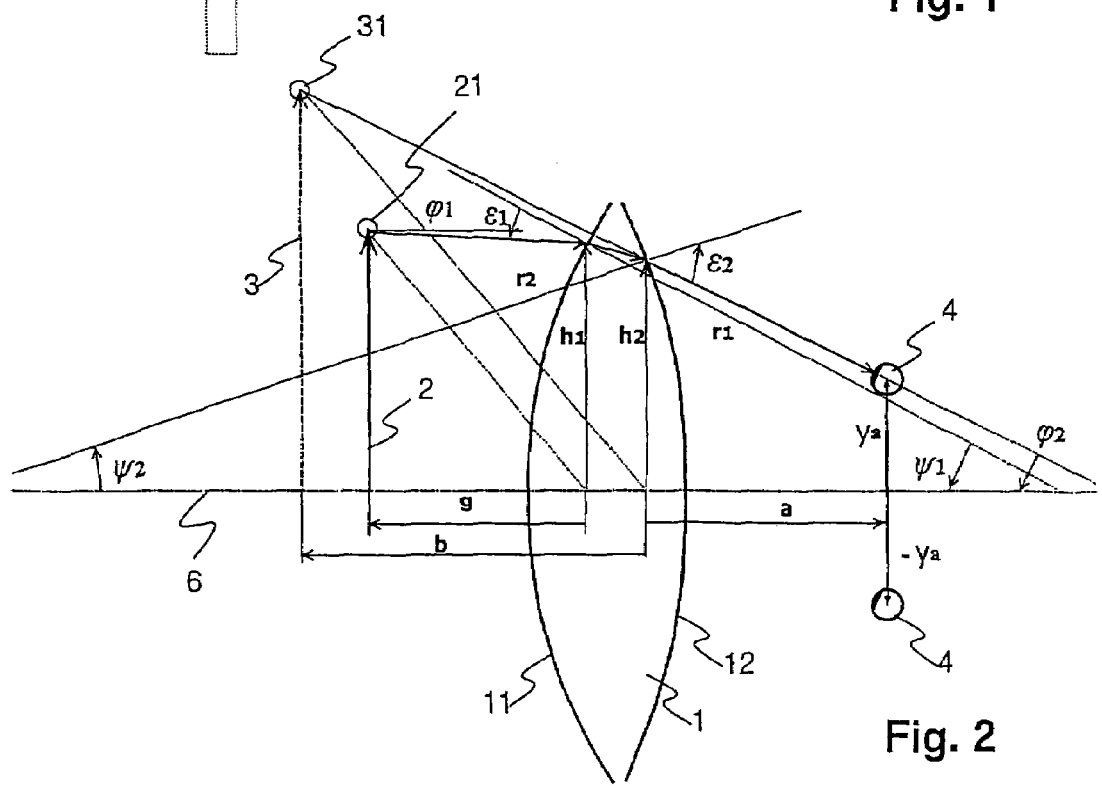
FIG. 2 a schematic representation of a beam path in an optical system according to the invention.

FIG. 2 shows a schematic representation of a beam path in an optical system according to the invention. For the purpose of a better overview, the object 2 and the picture 3 have not been drawn in as a whole, but only the respective representative arrows. A beam path between an object 21 at the end of the arrow tip in the plane of the object 2 and an eye 4 is drawn in schematically. Both eyes 4 simultaneously observe the object point 21 through the large-surfaced lens l and see it as a picture point 31. The eyes 4 in each case are distanced to the lens axis 6 by half the eye middle distance ya.

In contrast to conventional theory, the lens is not optimised for an individual eye on the lens axis 6 but for two distanced eyes 4. A respective perceived picture point 31 is determined proceeding from an object point 21, and specifically for various spectral components of the light emitted from the object point 21. For this, proceeding from a known position of the object point 21 and of the observed eye 4 and a lens arrangement and geometry which is assumed as being given, a boundary value problem is solved in order to determine the beam path from the object point 21 to the eye 4. The law of refraction at the same time must be fulfilled on the surfaces of the lens 1, thus on an inner lens surface 11 and on an outer lens surface 12.

The entry angle ϵ1 and the exit angle ϵ2 of a beam corresponding to the defined beam path are exterior angles. The following applies $$\epsilon 1 = \phi 1 + \psi 1 \text{ and } = \phi 2 + \psi 2$$

The light beam experiences the smallest deflection and thus also the smallest error if the entry angle ϵ1 and the exit angle ϵ2 are equal to one another. This requirement may however not be fulfilled over the complete picture region for a large-surfaced lens and an extended object. The eye 4 perceives a bundle of light beams which is emitted by the object point 21 as coming from the picture point 31. The aperture angle of this bundle is relatively small due to the small opening of the pupil. The bundle is not imaged onto the picture point 31 in an accurate manner due to astigmatism and coma. Astigmatism relates to beam bundles which pass the lens 1 in a slanted manner and coma concerns widely opened beam bundles. Chromatic errors lead to the fact that the bundle, depending on the colour, or spectral components of the bundle are not perceived in the picture point 31 in an exact manner. For example a green, a red and a blue object point 21 which overlap in the plane of the object, thus lie at the same location, do not lie at the same location in the picture plane; thus they are perceived lying at different locations. Chromatic errors may not be corrected with an individual lens which is why a material with a small dispersion, for example PMMA is used.

A white object point 21 is thus perceived as a blurred or distorted picture point 31. An optimum is found in the following manner so that the blur is distributed uniformly: This blur or distortion of the picture point 31 is determined for several, for example 28 object points 21 which are distributed uniformly over a quadrant of the complete surface or of the plane of the object 2. The imaging for example in each case of eight blue, green and red beam bundles is determined for each point. The average square of the errors of the deviations are summed as a measure of the deviation for each point. For optimisation, the errors are summed over all the points and for both eyes, thus in total for 56 points. Additionally the blur is empirically evaluated. For a given focal width f the radius r1 of the inner lens surface 11 and the radius r2 of the outer lens surface 12 are systematically varied until as an optimum, a uniform and as a whole minimal distribution of the blur over all observed object points 21, thus over the entire picture and for both eyes 4 is found. The lens 1 is optimised for the observation of the entire object 2 with both eyes 4 by way of this. This variation of the radii may be repeated for other focal widths f and respective object distances g and picture distances b as the case may be.

Preferably the radius r1 of the inner lens surface 11 is smaller than the radius r2 of the outer lens surface 12. By way of this, the distortions are smaller than in the reverse case.

Conventional methods for the design of a lens however provide optimal imaging for only one eye on the lens axis 6. One also optimises for a relatively large bundle of light beams which emanate from the object point 21. A curvature of the lens 1 or radii r1 and r2 are determined which are different than according to the method described above. For this reason, the various blurs and distortions increase with an increasing eye middle distance ya to the lens axis 6, so that only a small part of the field of view is seen in an adequately well-defined manner and may indeed be used. The blurred regions lead to an irritation of the observer and strenuous movements on attempting to see a certain region of the picture in a well-defined manner.

The use of the above-described optimisation method according to the invention for example yields the following preferred values for an average eye middle distance ya of 68 mm (all measures in millimeters):

| object distance g | eye distance a | r1 | r2 |
|---|---|---|---|
| focal width f = 1200 mm | | | |
| −300 | 300 | 529.5 | 5'000 |
| −300 | 450 | 558.4 | −10'000 |
| −300 | 600 | 770.0 | −2'500 |
| −450 | 300 | 529.5 | 5'000 |
| −450 | 450 | 627.1 | −10'000 |
| −450 | 600 | 833.7 | −2'000 |
| focal width f = 1000 mm | | | |
| −300 | 300 | 449.4 | 5'000 |
| −300 | 450 | 586.2 | −3'000 |
| −300 | 600 | 726.0 | −1'500 |
| −450 | 300 | 517.0 | −10'000 |
| −450 | 450 | 609.6 | −2'500 |
| −450 | 600 | 783.9 | −1'300 |

Negative values of r2 correspond to a biconvex lens, positive values of r2 to a concave-convex lens. Values of the radii which are approximately equal to the specified values are preferred. A variation of the radii of aprox. 10% to 20% about the specified values still lead to good results. Also instead of lenses with a large r2, for example −10'000 mm, one may also use piano-convex lenses.

The focal width f is preferably at least approx. 600, 650 or 700 mm so that a greater enlargement is possible without distortions which would occur at small focal widths f becoming too large. On the other hand the focal width f is preferably 2000 mm at the most, since for larger values with a meaningful object distance g, the resulting enlargement would not be sufficient. Thus preferred focal widths lie in the range of 800 mm to 1500 mm.

The object distance g is preferably between 160 mm and 1500 mm, in particular between 200 mm and 800 mm. Smaller values of up to for example 30 mm are also possible, but with a correspondingly smaller amplification. The eye distance a is preferably 100 mm to 1500 mm, in particular 205 mm to 1400 mm.

The diameter of the lens 1 is preferably larger than 250 mm, in particular it is larger or equal to 380 mm and smaller than 1000 mm.

In a preferred embodiment of the invention, the lens is plano-convex, with a diameter of approx. 380 mm and a radius of curvature of the convex side between 550 mm and 640 mm, in particular 585 mm and 605 mm, and preferably at least approximately 594 mm.

The lenses according to the described embodiments of the invention are preferably antireflected on one or both sides. The antireflection is effected by way of depositing one or more optically active layers in a vapour deposition or immersion method or by way of sticking on an antireflecting film or an antireflecting laminate.

Since a laminate with a thickness for example of approx. 0.2 mm as a rule is constructed of several layers and is harder and stiffer in comparison to a film, thus may not be greatly stretched, the laminate is preferably stuck onto the plane side of a plano-convex lens.

Figure 3:
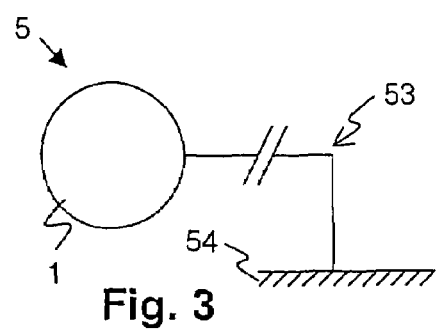
FIG. 3 a view of a first embodiment form of a device according to the invention.

FIG. 3 shows a front view of a first embodiment of an observation device 5 according to the invention. It comprises a round lens 1 with a diameter of 380 mm, consists of the material PMMA (polymethylmethacrylate), and has a weight of about 1.3 kg. In this example, the lens is biconvex and for minimising the imaging errors comprises two different radii of curvature. The observation device 5 comprises an adjustable holding arm 53 for positioning the lens 1 in front of a screen, in particular a computer screen. The holding arm 53 may be fastened to a table and preferably has five or six degrees of freedom in which the lens 1 may be moved. The lens 1 may also be designed in an oval or rectangular or square manner.

Figure 4:
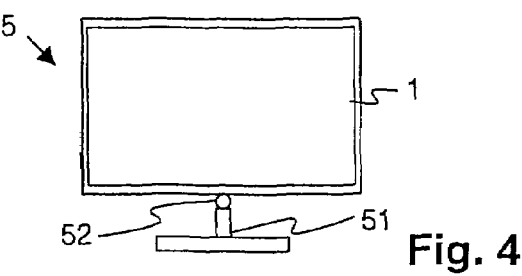
FIG. 4 a plan view of a second embodiment form of a device according to the invention.

FIG. 4 shows a front view of a second embodiment of an observation device 5 according to the invention. The applied lens 1 is rectangular, wherein a diagonal of the rectangle is essentially equal to the lens diameter of the previous embodiments. The lens 1 is fastened to a foot 51 via an optional inclining or setting device 52 and this foot may be placed onto the surface of a table. The foot 51 for example comprises exchangeable elements for achieving different heights of the lens 1 above the surface of the table. In a further embodiment of the invention, the foot is formed in a bridge-like manner so that it may be placed over a computer keyboard, which permits a larger object distance g. Of course such a foot may also be combined with a round or a differently shaped lens 1.

| LIST OF REFERENCE NUMERALS | |
|---|---|
| f | focal width |
| g | object distance |
| b | picture distance |
| a | eye distance |
| 1 | visual medium, lens |

-continued

LIST OF REFERENCE NUMERALS

| | |
|---|---|
| 11 | inner lens surface |
| 12 | outer lens surface |
| 2 | object |
| 21 | object point |
| 3 | picture |
| 31 | picture point |
| 4 | eye |
| 5 | observation device |
| 51 | foot |
| 52 | adjustment means |
| 53 | holding arm |
| 54 | table |
| 6 | lens axis. |

The invention claimed is:

1. A device for observing a display screen (2), comprising a large-area visual medium (1) to be arranged in front of the display screen (2), wherein the device comprises a holding means (53; 51, 52) for arranging the visual medium (1) in front of the display screen (2), and in that visual medium (1) has a focal width (f) between 1122 mm and 1405 mm and wherein the device has a diameter of more than 370 mm.

2. The device according to claim 1, wherein the device is optimized for observing a complete display screen (2) with both eyes (4).

3. The device according to claim 1, wherein the device is envisaged for an eye distance (a) of 220 mm to 1500 mm.

4. The device according to claim 1, wherein the device is envisaged for an object distance (g) of 100 mm to 1500 mm.

5. The device according to claim 1, wherein the device has a focal width (f) between 1149 mm and 1347 mm.

6. The device according to claim 5, wherein the device has a focal width (f) between 1194 mm and 1235 mm.

7. The device according to claim 6, wherein the device has a focal width (f) of 1200 mm.

8. The device according to claim 1, wherein the device has a diameter between 370 mm and 380 mm.

9. The device according to claim 1, wherein the device comprises a system of several lenses.

10. The device according to claim 1, wherein the device comprises a single, spherical lens (1).

11. The device according to claim 10, wherein the lens (1) is piano-convex, concave-convex or biconvex.

12. A device for observing a display screen (2), comprising a large-area visual medium (1) to be arranged in front of the display screen (2), wherein the device comprises a holding means (53; 51, 52) for arranging the visual medium (1) in front of the display screen (2), and in that visual medium (1) has a focal width (f) between 1122 mm and 1405 mm, wherein the device comprises a single, spherical lens (1) that is piano-convex, and the convex side has a radius of curvature (r1) between 501 mm and 752 mm.

13. The device according to claim 12, wherein the convex side has a radius of curvature (r1) between 564 mm and 690 mm.

14. A device for observing a display screen (2), comprising a large-area visual medium (1) to be arranged in front of the display screen (2), wherein the device comprises a holding means (53; 51, 52) for arranging the visual medium (1) in front of the display screen (2), and in that visual medium (1) has a focal width (f) between 1122 mm and 1405 mm, wherein the device comprises a single, spherical lens (1) that is biconvex and has a first radius of curvature (r1) in the region between 667 mm and 1,000 mm and a second radius of curvature (r2) in the region between −1600 mm and −2400 mm.

15. The device according to claim 14, wherein the lens (1) is biconvex and has a first radius of curvature (r1) between 750 mm and 917 mm and a second radius of curvature (r2) between −1800 mm and −2200 mm.

16. A device for observing a display screen (2), comprising a large-area visual medium (1) to be arranged in front of the display screen (2), wherein the device comprises a holding means (53; 51, 52) for arranging the visual medium (1) in front of the display screen (2), and in that visual medium (1) has a focal width (f) between 1122 mm and 1405 mm, wherein the device comprises a single, spherical lens (1) that is biconvex and has a first radius of curvature (r1) in the region of 616 mm to 924 mm and a second radius of curvature (r2) in the region of −2000 mm to −3000 mm.

17. The device according to claim 16, wherein the lens (1) is biconvex and has a first radius of curvature (r1) between 693 mm and 847 mm and a second radius of curvature (r2) between −2250 mm and −2750 mm.

18. A device for observing a display screen (2), comprising a large-area visual medium (1) to be arranged in front of the display screen (2), wherein the device comprises a holding means (53; 51, 52) for arranging the visual medium (1) in front of the display screen (2), and in that visual medium (1) has a focal width (f) between 1122 mm and 1405 mm, wherein the device comprises a single, spherical lens (1) that is concave-convex and comprises a first radius of curvature (r1) in the region of 424 mm to 635 mm and a second radius of curvature (r2) in the region of 4,000 mm to 6,000 mm.

19. The device according to claim 18, wherein the lens (1) is concave-convex and comprises a first radius of curvature (r1) between 477 mm to 582 mm and a second radius of curvature (r2) between 4,500 mm and 5,500 mm.

20. A device for observing a display screen (2), comprising a large-area visual medium (1) to be arranged in front of the display screen (2), wherein the device comprises a holding means (53; 51, 52) for arranging the visual medium (1) in front of the display screen (2), and in that visual medium (1) has a focal width (f) between 1122 mm and 1405 mm, wherein the device comprises a single, spherical lens (1) that is piano-convex, and has a radius of curvature in the region between 550 mm and 660 mm.

21. The device according to claim 20, wherein the lens (1) has a radius of curvature in the region between 585 mm and 605 mm.

22. The device according to claim 10, wherein the lens antireflected at least on one side by way of a film which is stuck on, or a laminate.

23. The device according to claim 10, wherein the lens is antireflected at least on one side by way of one or more optically active layers which are vapor deposited or deposited by an immersion method.

24. The device according to claim 1, wherein the holding means is an adjustable arm (53) with several degrees of freedom which may be fastened on a table (54).

25. A device for observing a display screen (2), comprising a large-area visual medium (1) to be arranged in front of the display screen (2), wherein the device comprises a holding means (53; 51, 52) for arranging the visual medium (1) in front of the display screen (2), and in that visual medium (1) has a focal width (f) between 1122 mm and 1405 mm, wherein the holding means is a table stand (51) with means (52) for adjusting the height and/or inclination of the visual medium (1).

26. Use of a device comprising a large-area visual medium (1) to be arranged in front of the display screen (2), wherein the device comprises a holding means (53; 51, 52) for arranging the visual medium (1) in front of the display screen (2), and in that visual medium (1) has a focal width (f) between 1122 mm and 1405 mm, by arranging the device at an object distance (g) of 200 mm to 800 mm from a display screen (2) and observing the display screen (2) through the device with an eye distance (a) of 220 mm to 1400 mm.

27. A device for observing a display screen (2), comprising, a large-area visual medium (1) to be arranged in front of the display screen (2), wherein the device comprises a holding means (53; 51, 52) for arranging the visual medium (1) in front of the display screen (2), at an object distance (g) of 200 mm to 800 mm and an eye distance (a) of 220 mm to 1400 mm, and the device comprises a single, piano-convex spherical lens (1) having a diameter between 370 mm and 380 mm, and the convex side of the lens (1) having a radius of curvature (r1) between 501 mm and 752 mm.

28. The device according to claim 27, wherein the convex side has a radius of curvature (r1) between 564 mm and 690 mm.

* * * * *

UNITED STATES PATENT AND TRADEMARK OFFICE
CERTIFICATE OF CORRECTION

PATENT NO. : 7,359,128 B2 Page 1 of 1
APPLICATION NO. : 10/538949
DATED : April 15, 2008
INVENTOR(S) : Meier It is certified that error appears in the above-identified patent and that said Letters Patent is hereby corrected as shown below:

In Column 7, Line 46 (Claim 11, Line 2), delete "piano" and insert --plano--.

In Column 7, Line 54 (Claim 12, Line 8), delete "piano" and insert --plano--.

In Column 8, Line 44 (Claim 20, Line 8), delete "piano" and insert --plano--.

In Column 8, Line 49 (Claim 22, Line 1), after "lens", insert --is--.

In Column 10, Line 4 (Claim 27, Line 7), delete "piano" and insert --plano--.

Signed and Sealed this

Twelfth Day of August, 2008

JON W. DUDAS
*Director of the United States Patent and Trademark Office*